US008804000B2

(12) United States Patent
Chang

(10) Patent No.: US 8,804,000 B2
(45) Date of Patent: Aug. 12, 2014

(54) MODULAR ARCHITECTURE HAVING REUSABLE FRONT END FOR PROCESSING DIGITAL VIDEO DATA

(75) Inventor: Chienchung Chang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/415,632

(22) Filed: Mar. 8, 2012

(65) Prior Publication Data

US 2012/0167156 A1 Jun. 28, 2012

Related U.S. Application Data

(62) Division of application No. 10/355,814, filed on Jan. 30, 2003, now Pat. No. 8,159,548.

(51) Int. Cl.
*H04N 5/228* (2006.01)

(52) U.S. Cl.
USPC ................ 348/222.1; 348/207.11; 348/207.1; 348/211.4; 348/211.6

(58) Field of Classification Search
USPC ........ 348/222.1, 207.99, 207.1, 211.4, 211.6, 348/211.9, 72–76
See application file for complete search history.

(56) References Cited

U.S. PATENT DOCUMENTS 5,926,219 A 7/1999 Shimizu et al.
6,005,613 A 12/1999 Endsley et al.
6,249,313 B1 * 6/2001 Nishi ......................... 348/231.9
6,509,927 B1 1/2003 Prater et al.
6,577,336 B2 6/2003 Safai
6,593,963 B1 * 7/2003 Safai .......................... 348/222.1
6,657,668 B1 12/2003 Hata
7,184,080 B2 2/2007 Kehtarnavaz et al.
7,295,972 B2 11/2007 Choi
7,432,952 B2 10/2008 Fukuoka
8,159,548 B2 4/2012 Chang
2002/0171737 A1 11/2002 Tullis
2002/0176009 A1 11/2002 Johnson et al.

(Continued)

FOREIGN PATENT DOCUMENTS

EP 0483745 A2 5/1992
EP 0975155 A2 1/2000

(Continued)

OTHER PUBLICATIONS

BT: "Proposed first draft of G.IPP: Transmission performance parameters of IP networks affecting perceived speech quality and other voiceband services," COM 12-D 126-E; ITU-T Draft Study Period 2001-2004, International Telecommunication Union, Geneva.

(Continued)

*Primary Examiner* — Yogesh Aggarwal
(74) *Attorney, Agent, or Firm* — Elaine H. Lo

(57) ABSTRACT

A device is described that includes an encoder/decoder (CODEC) in which functionality is partitioned between a video front end (VFE) and a video back end (VBE). The VFE encapsulates functionality and image processing operations to support a variety of applications, and presents a flexible inter-processor by which an external master device can easily control these operations. The video back end (VBE) operates as an encoder and/or a decoder to generate encoded and/or decoded video sequences. The VFE and VBE may execute within an operating environment provided by a slave device.

56 Claims, 4 Drawing Sheets

(56) References Cited

U.S. PATENT DOCUMENTS

| | | | |
|---|---|---|---|
| 2002/0191090 | A1 | 12/2002 | Safai |
| 2003/0052978 | A1 | 3/2003 | Kehtarnavaz et al. |
| 2005/0088561 | A1 | 4/2005 | Takezawa et al. |

FOREIGN PATENT DOCUMENTS

| | | | |
|---|---|---|---|
| JP | H01316881 | A | 12/1989 |
| JP | H06125411 | A | 5/1994 |
| JP | H07226911 | A | 8/1995 |
| JP | H07240866 | A | 9/1995 |
| JP | 8237550 | A | 9/1996 |
| JP | 11215426 | A | 8/1999 |
| JP | 2000092361 | | 3/2000 |
| JP | 2000115688 | A | 4/2000 |
| JP | 2000235644 | A | 8/2000 |
| JP | 2002010277 | A | 1/2002 |
| JP | 2002189993 | | 7/2002 |
| JP | 2002320208 | A | 10/2002 |
| WO | WO2006052395 | | 5/2006 |

OTHER PUBLICATIONS

International Search Report and Written Opinion—PCT/US2004/002713, International Search Authority—European Patent Office—Jun. 7, 2004.

* cited by examiner

MODULAR ARCHITECTURE HAVING REUSABLE FRONT END FOR PROCESSING DIGITAL VIDEO DATA

CLAIM OF PRIORITY UNDER 35 U.S.C. §120

The present Application for Patent is a Divisional of U.S. patent application Ser. No. 10/355,814, "MODULAR ARCHITECTURE HAVING REUSABLE FRONT END FOR PROCESSING DIGITAL VIDEO DATA," filed Jan. 30, 2003, and assigned to the assignee hereof and hereby expressly incorporated by reference herein.

TECHNICAL FIELD

This disclosure relates to techniques for processing digital video data.

BACKGROUND

With recent increases in computer processing capabilities and affordability, full motion digital video devices are becoming more widely available. In particular, digital video capabilities have been incorporated into a wide range of devices including digital televisions, digital direct broadcast systems, wireless communication devices, portable digital assistants (PDAs), laptop computers, and desktop computers. These devices can provide significant improvements over conventional analog video systems in creating, modifying, transmitting, storing, and playing full motion video sequences.

To integrate digital video capabilities, these devices often support a variety of camcorder or camera applications. For example, these devices typically include a digital viewfinder or other display, an image sensor for video data capture, and image processing functions to perform specialized image manipulation, as well as compression and decompression of the digital video data in accordance with one or more of a variety of video compression standards or processes. Providing these digital video capabilities often requires a significant amount of specialized hardware, software, or both.

SUMMARY

In general, this disclosure describes techniques for processing digital video data, such as encoding or decoding digital video data. A device, such as an encoder, a decoder or an encoder/decoder (CODEC), includes an innovative architecture in which functionality is partitioned between a video front end (VFE) and a video back end (VBE). The VFE encapsulates functionality and image operations to support a variety of applications, and presents a flexible inter-processor interface by which an external master device can easily control these operations.

This partitioning insulates the VBE from a variety of implementation-specific functions, such as interfacing directly with camera interface hardware, performing color conversion and other image processing functions necessary to drive viewfinder, or operations. Consequently, the techniques described herein may provide a distributed video system that eases integration of digital video capabilities within new devices. The VFE may easily be reused in different applications with any desired image sensor, display, and back-end software or firmware, or combination thereof, to easily integrate video data capabilities into new products or devices.

In one embodiment, a system comprises a video front end (VFE) having a programmable interface to receive commands, wherein the VFE captures video input data and pre-process the video input data to produce video output data in accordance with the commands. The system further comprises a video back end (VBE) to generate an encoded sequence of video data from the video output data of the VFE, and a controller to provide commands to the VFE via the interface to control the desirable pre-processing of the video input data.

In another embodiment, a device comprises a video front end (VFE) executing within an operating environment provided by the device and includes a programmable interface to receive commands from an external device. The VFE captures video input data and pre-process the video input data in accordance with the commands to produce video output data for encoding by a video back end and video display data for display by a display device.

In another embodiment, a device comprises means for programmatically receiving commands from a master device, and means for capturing and pre-processing video input data to produce video output data and video display data in accordance with the commands. The device further comprises means for generating an encoded sequence of video data from the video output data.

In another embodiment, a method comprises programmatically receiving commands from a master device via an inter-processor interface, and capturing and pre-processing video input data via a slave device in accordance with the commands to produce video output data in a first image format and video display data in a second image format. The method further comprises communicating the video output data to an encoder for generation of an encoded sequence of video data; and communicating the video display data to an output device for display.

The details of one or more embodiments are set forth in the accompanying drawings and the description below. Other features, objects, and advantages will be apparent from the description and drawings, and from the claims.

DETAILED DESCRIPTION

Figure 1:
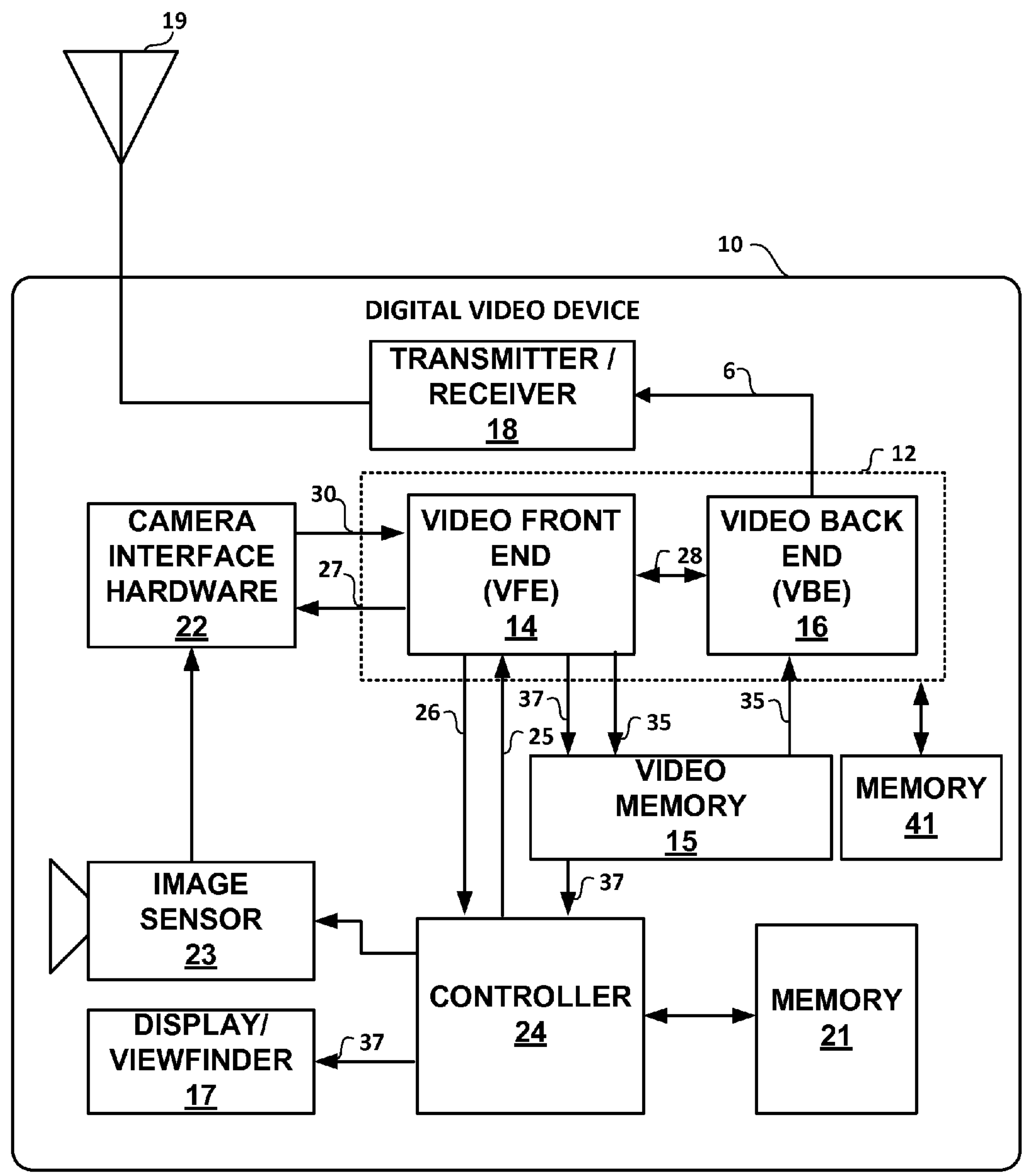
FIG. 1 is a block diagram illustrating an example digital video device incorporating a video encoder/decoder (CODEC) that is partitioned between a video front end (VFE) and a video back end (VBE).

FIG. 1 is a block diagram illustrating an example digital video device 10 incorporating a video encoder/decoder (CODEC) 12 that is partitioned between a video front end (VFE) 14 and a video back end (VBE) 16. Device 10 may operate as a source device that transmits an encoded sequence of video data to a receiving device (not shown). Similarly, device 10 may operate as a receive device capable of receiving and decoding video data. Example devices include servers located on a computer network, workstations or other desktop computing devices, and mobile computing devices, such as laptop computers, a personal digital assistant (PDA), a wireless communication device, and the like. Other examples include digital television broadcasting satellites, digital televisions, digital video cameras or other recording devices, digital video telephones, wireless video devices, and the like.

For purposes of example, digital video device 10 is illustrated as a wireless device, such as a cellular phone. However, the techniques described herein are not limited to wireless devices, and may be readily applied to other digital video devices. Furthermore, although illustrated in reference to a CODEC, this disclosure is not so limited and may readily be applied to encoders and decoders.

Controller 24 provides primary control over the components of CODEC 12, including VFE 14, and coordinates communication with the other components of digital video device 10. Controller 24 directs CODEC 12 to perform many of the computationally intensive tasks required for encoding and decoding digital video sequences. CODEC 12 may take the form of a digital signal processor (DSP), and may have a dedicated memory 41 for storing instructions and data. Alternatively, or in addition, CODEC 12 may include dedicated hardware, software, firmware, or combinations thereof. Similarly, controller 24 may take the form of an embedded microprocessor, specialized hardware, software, e.g., a control software module, or combinations thereof. Moreover, CODEC 12 and controller 24, as well as other components of device 10, may be implemented in one or more application-specific integrated circuit (ASIC), as multiple discrete components, or combinations thereof.

Digital video device 10 also includes a number of different peripherals, such as a display or viewfinder 17 and an image sensor 23. Under the direction of controller 24, CODEC 12 captures video input data 30 (VID) from image sensor 23, and communicates the video input data to VFE 14. Camera interface 22 is responsible for abstracting the interface details of image sensor 23. For example, in response to controls and configuration data 27 from VFE 14, camera interface 22 synchronizes horizontal and vertical reference signals in the data received from image sensor 23. Camera interface 22 may also include limited functionality to processes the video data, such as by masking pixels.

In general, VFE 14 of CODEC 12 encapsulates functionality and pre-processing operations to support a variety of camera or camcorder applications, and includes a flexible inter-processor interface for controlling these operations. The primary task of VFE 14 is to process incoming video input data 30 in real-time. VFE 14 receives video input data 30, and processes the data to produce video output data (VOD) 35 into acceptable format for VBE 16 based on commands and configuration parameters 25 received from controller 24. In addition, VFE 14 formats video input data 30 to produce video display data (VDD) 37 in a form suitable for display by viewfinder 17, which may comprise any output device for displaying the VDD, e.g., a liquid crystal display (LCD) for a camcorder or a mobile phone screen. VFE 14 stores video output data 35 and video display data 37 within video memory 15 for access by VBE 16 and controller 24, respectively. VFE 14 provides status information 26 via the inter-processor interface to indicate the status of pending commands.

VFE 14 may perform complex image processing operations on video input data 30, such as converting color video frames to black-and-white format, modifying contrast or luminance characteristics of the data, digitally enhancing or modifying lighting conditions for the captured data, performing a digital zoom operation, image sensor processing and compensation, e.g., white balancing, automatic gain control, and gamma correction, and modifying the captured video data to simulate halos, sunsets, star filters or other filter effects. In addition, VFE 14 may reduce the frame rate or image size of the captured video input data 30.

As described in further detail below, VFE 14 presents an inter-processor application-programming interface (API) that allows controller 24 to easily control and reconfigure VFE 14. The API provides an inter-processor interface, allowing VFE 14 to act as a slave to controller 24.

VBE 16 may comprise any software application, hardware unit, or the like, that encodes or decodes video data. More specifically, VBE 16 may utilize video output data 35 to generate an encoded bit stream of video sequences. When operating as an encoder, VBE 16 encodes video output data 35, and may buffer the encoded bit stream within video memory 15, e.g., for wireless transmission via transmitter/receiver 18 and antenna 19. For example, VBE 16 may comprise a JPEG still image encoder for a digital camera, an MPEG video encoder for a digital camcorder, and the like. VBE may be, therefore, a proprietary encoder or decoder, or may processes video output data 35 in accordance with one or more of a variety of data compression standards, such as MPEG-1, MPEG-2, or MPEG-4 by The Moving Picture Experts Group (MPEG), QuickTime™ by Apple Computer of Cupertino Calif., Video for Windows™ developed by Microsoft Corporation of Redmond, Wash., Indeo™ developed by Intel Corporation, RealVideo™ from RealNetworks, Inc. of Seattle, Wash., and Cinepak™ developed by SuperMac Inc, H.263, H.264, JPEG 2000, and the like.

Alternatively or in addition, VBE 16 may operate as a decoder. More specifically, VBE 16 may receive a bit stream of encoded video sequences from receiver/transmitter 18, and process the bit stream to produce decoded video sequences for processing and display by VFE 14. VFE 14 and VBE 16 may exchange control signals 28 to trigger video processing operations. For example, controller 24 or VFE 14 may trigger encoding operations by VBE 16. When operating as a decoder, controller 24 or VBE 16 may trigger operations by VFE 14. VFE 14 and VBE 16 may be provided as standalone hardware or software modules, e.g., software modules for execution by a DSP, or combinations thereof.

Memories 21, 41 stores instruction and data for use by controller 24 and CODEC 12, respectively. Although illustrated as separate memories, memories 21, 41 may be a common memory device. Memories 21, 41 may comprise read-only memory (ROM), synchronous dynamic random access memory (SDRAM), non-volatile static random access memory (SRAM), Flash memory, electrically erasable programmable read-only memory (EEPROM), and the like. Video memory 24 may take the form of Video Dynamic Memory Access (VDMA). As illustrated, memories 15, 21 may be external to CODEC 12 and coupled to controller 24.

Partitioning the functionality of CODEC 12 into VFE 14 and VBE 16, as described, insulates VBE 16 for having to perform a variety of implementation-specific functions, such as interfacing directly with camera interface hardware 22, performing color conversion and other image processing functions necessary to drive viewfinder 17, or other implementation-specific operations. Consequently, VFE 14 may be viewed as performing implementation-specific image processing functions, while VBE 16 can perform implementation-independent image processing functions.

In addition, the partitioning may provide increased flexibility to ease integration of digital video capabilities within new devices. For example, the functional partitioning between VFE 14 and VBE 16 yields a distributed video system, and allows a designer to easily reuse VFE 14 with any desired back-end software or firmware, or combination thereof, to integrate video data capabilities into new products or devices. In this manner, new video compression standards may easily be supported by coupling VFE 14 with a new VBE 16. In other words, a designer may reuse VFE 14 as a common module with any desired different VBEs or other application software or firmware, even proprietary VBEs, to integrate digital video capabilities within a new device. Moreover, the flexibility and configurability of VFE 14 allows the VFE to be easily used with different image sensors and display devices. Consequently, VFE 14 may easily be reused and embedded within multiple devices with little or no change, and may ease design and production of new devices, such as a JPEG-based still digital camera, or a cellular phone that integrates MPEG-based video capture and communication.

Figure 2:
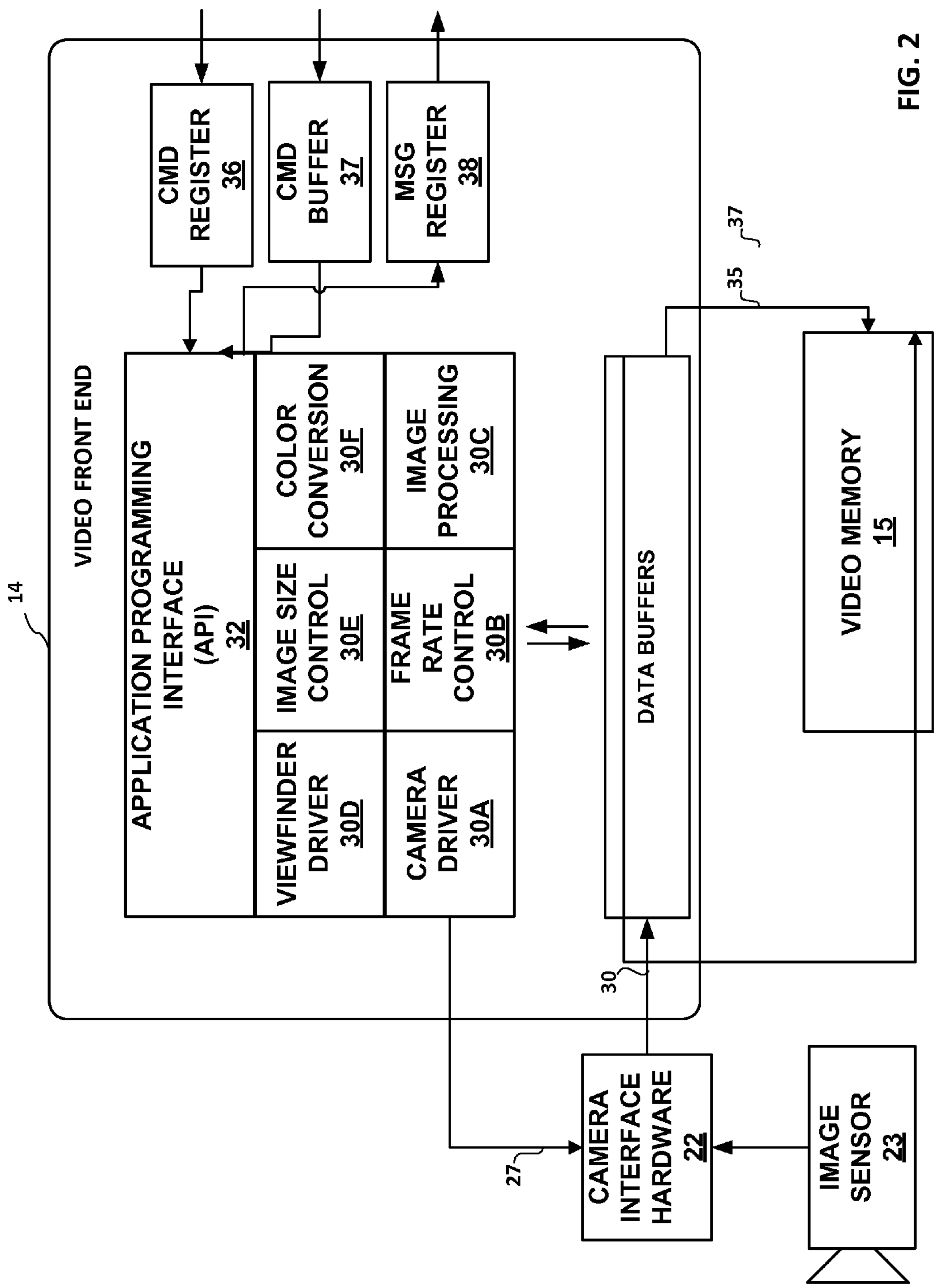
FIG. 2 is a block diagram illustrating an example embodiment of the VFE of FIG. 1 in further detail.

FIG. 2 is a block diagram illustrating an example embodiment of VFE 14 (FIG. 1) in further detail. As illustrated, VFE 14 may include a number of functional modules 30A-30F, and a common application programming interface (API) 32 by which controller 24 may programmatically configure the modules. Many of modules 30, i.e., modules 30B-30F, may be used both to pre-process video data for encoding by VBE 16, and for post-processing decoded video sequences produced by VBE 16. In this manner, modules 30 may be used in a variety of applications. Modules 30 may be implemented as software modules for execution within an operating environment provided by CODEC 12, e.g., on a DSP. However, modules 30 may be implemented in hardware, firmware, software, or combinations thereof.

Camera driver 30A interfaces directly with camera interface hardware 22, and programs the hardware to capture one or more video frames from image sensor 32. In particular, camera driver 30A issues commands 27 and, in response, receives video input data 30.

For example, camera driver 30A programmably configures camera interface hardware 22 to start and stop video capture. In addition, camera driver 30A defines an image frame dimension, e.g., lines per frame and pixels per line, and an image window for data collection, a data format, e.g., little or big Endian. Further, camera driver 30A may issue commands 27 to direct camera interface hardware 22 to perform initial sub-sampling along the space domain and the time domain to reduce the image size and frame rate.

Camera driver 30A processes video input data 30, and stores the processed data to video memory 15 (FIG. 1) in a standard form for backend processing by VBE 16. Camera driver 30A may, for example, store the image in YCbCr (Luminance-Chrominance) 4:2:2 format, which means that the chrominance values for the image data is sub-sampled only in the horizontal direction. For example, camera driver 30 may process a color image or frame of size 352×288 pixels to produce a frame in which the luminance data remain 352×288, but the chrominance values are sub-sampled to a size of 176×288 pixels.

Frame rate control module 30B provides functionality to down sample or up sample the sequence of video data captured by image sensor 23 and produced by camera interface 22, i.e., video input data 30, to a desirable frame rate. Frame rate control module 30B may, for example, down sample or up sample the incoming video frames of video input data 30 by a fractional or integer factor, giving VFE 14 flexibility for use in a wide range of applications.

Image processing module 30C allows controller 24 to programmably select and apply frame-by-frame image processing functions to incoming video input data 30. For example, controller 24 may issue commands via API 32 to select functions like conversion of color video frames to black-and-white format, modify contrast or luminance characteristics of the data, digitally enhance or modify lighting conditions for the captured data, perform a digital zoom operation, image sensor processing and compensation, e.g., white balancing, automatic gain control, and gamma correction, and modify the captured video data to simulate halos, sunsets, star filters or other filter effects. Image processing module 30C may apply these functions to pre-process video input data 30 for encoding by VBE 16, or to post-process decoded video sequences produced by VBE 16. For example, image processing module 30C may apply these functions to enhance the decoded video sequences produced by VBE 16 from a received video bit stream.

Image size control module 30E provides functionality to down sample or up sample an image size to a desirable image size. Moreover, image size control module 30E may down sample the image size and retain the aspect ratio, or achieve a different desirable aspect ratio. For example, a VGE image having resolution of 640×480 may be sub-sampled to CIF format having a resolution 352×288. Image size control module 30E may, for example, down-sample the image size of video input data 30 by a fractional or integer factor, giving VFE 14 flexibility for use in a wide range of applications.

Viewfinder driver 30D provides functionality for driving viewfinder 17 with video display data 35. Viewfinder 17 may require video display data 35 in a format that is significantly different from the format of video input data 30 or video output data 35. For example, viewfinder 17 may require video display data 35 at different frame rate or image size. Viewfinder driver 30D may make use of frame rate control module 30C and image size control module 30E to processes video input data 30 and produce video display data 35 in a form suitable for display by viewfinder 17.

Color conversion module 30F provides functionality for converting video input data 30 to a different color space, e.g., a different format for representing the color image data. For example, color conversion module 30F may process video input data 30 to produce video output data 35 in YCbCr (Luminance-Chrominance) 4:2:2 format for use by VBE 16. In addition, color conversion module may also process video input data 30 to produce video display data 35 in RGB format for display by viewfinder 17. Moreover, color conversion module may control the color depth of the format produced, e.g., 16-bit, 18-bit, and 24-bit depth.

Controller 24 programmatically configures and interacts with modules 30 of VFE 14 by issuing commands in accordance with API 32. In one embodiment, API 32 supports the following commands:

CONFIG—The CONFIG command is used to program VFE 14, and allows controller 24 to specify a wide range of parameters for controlling the functionality of modules 30.

CAPTURE—The CAPTURE command initiates the capture and processing of video input data 30 via VFE 14

IDLE—The IDLE command directs VFE 30 to halt capture of video input data 30.

To issue the above commands, controller 24 may write the commands to memory within CODEC 12. More specifically, CODEC 12 may include a command (CMD) register 37 for holding the pending command, and a command (CMD) buffer 36 for holding any parameters associated with the command. Upon writing a command and associated parameters to command register 37 and command buffer 36, respectfully, controller 24 issues an interrupt to VFE 14 to indicate a command is pending. In one example embodiment, command register 37 comprises a single 32-bit buffer to store a command header for the particular command being issued. Command buffer 36 comprises buffer having a size of cable of storing twenty-three 32-bit words.

VFE 12 utilizes message (MSG) register 38 to indicate the status of pending commands, e.g., whether the command has been completed, or whether an illegal command was encountered. VFE 12 issues interrupts to controller 24 to indicate the availability of new status information within message register 38. Controller 24 accesses message register 38 to verify that the previous command has been completely processed prior to issuing a subsequent command.

In one embodiment, message register 38 stores status messages in eight 32-bit words as follows:

TABLE 1

| Message | Size (words) | Description |
|---|---|---|
| Frame Message | 4 | End of frame status that encodes VOD and VDD information for the controller |
| CONFIG command complete message | 1 | Indicates the CONFIG command has completed |
| IDLE command complete message | 1 | Indicates the IDLE command has completed |
| ILLEGAL command complete message | 1 | Indicates controller 24 issued an illegal command |
| Fatal error message | 1 | Indicates a fatal error has occurred |

In one embodiment, the CONFIG command includes an extensive parameter list that allows controller 24 to easily programmatically configure VFE 14 as necessary to support the video capabilities required by device 10. More specifically, controller 24 writes command buffer 36 with a twenty-three (23) word parameter list, as illustrated in the following table:

TABLE 2

| Word | Configuration | Settable parameters |
|---|---|---|
| 1 | Video Input Data | Frame row width, number of pixels per row, frame column height, number of rows per frame, input image format of VID. |
| 2 | Video Output Data | Enable/disable VDD X and Y zoom factors, enable/disable byte swap, image format of VOD. |
| 3 | Video Output Data | X and Y pixels to clip, X & Y clipping control, enable VBE trigger. |
| 4 | Video Output Data | Specifies a bit pattern for choosing frames to keep and drop relative to VID. If bit N is set, for example, the Nth frame is dropped. Also specifies a number of bits used starting from the LSB. |
| 5 | Video Display Data | Enable/disable VDD X and Y zoom factors, enable/disable byte swap, image format of VDD. |
| 6 | Video Display Data | X and Y pixels to clip, X & Y clipping control, enable VBE trigger. |
| 7 | Video Display Data | Specifies a bit pattern for choosing frames to keep and drop relative to VID. If bit N is set, for example, the Nth frame is dropped. Also specifies a number of bits used starting from the Least Significant Bit (LSB). |
| 8 | VOD and VDD Image Processing | Specifies an intensity scale factor for processing VID for both VDD and VOD. |
| 9 | Snapshot Mode | Enable/Disable snapshot mode. Directs VFE to receive and process a single frame. One frame will be generated for VOD and VDD. |
| 10-13 | Ping-Pong Buffers | Ping-pong buffers for VOD and VDD. |
| 14 | Camera Interface Hardware | Enable/disable VSYNC, HSYNC, Endian selection, |
| 15 | Camera Interface Hardware | Configuration of synchronization for camera include rising/falling edge synchronization, values of pixel counters and line counters for resynchronization. |
| 16 | Camera Interface Hardware | Specify any programmable start of frame (SOF), end of frame (EOF), start of line (SOL), or end of line (EOL) settings. |
| 17 | Camera Interface Hardware | Specify behavior of HSYC during vertical blanking period. |
| 18 | Camera Interface Hardware | Course settings for VSYNC, including line counters for VSYNC high and VSYNC low. |
| 19-22 | Camera Interface Hardware | Specifies a value of the pixel counter when VSYNC goes high and low, a value at which the line counter and pixel counter reset, values of the pixel counter for starting and stopping collection of data for a line, values for the line counter at which to start and stop collection of data for the frame. |
| 23 | Camera Interface Hardware | Specifies a number of frames to skip after collecting a frame, a line skip pattern, and a pixel skip pattern. |

Figure 3:
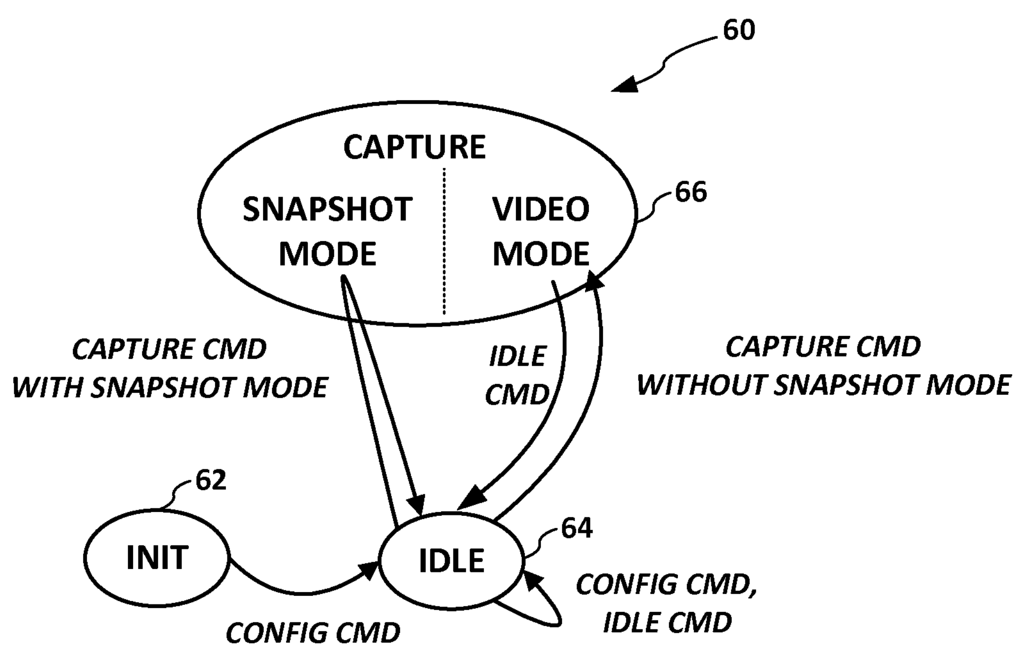
FIG. 3 is a state diagram illustrating example operation of the VFE in further detail.

FIG. 3 is a state diagram illustrating example operation of VFE 14 in further detail. In this example, state machine 60 includes three states: INIT state 62, IDLE state 64, and CAPTURE state 66.

Upon initial power-up or a hardware reset, VFE 14 enters INIT state 62. For VFE 14 to exit this state, controller 24 must issue a CONFIG command to programmatically configure VFE 14, as described above. Upon receiving the CONFIG command, VFE 14 transitions to IDLE state 64.

Within the IDLE state 64, VFE 14 accepts all three possible commands from controller 24 without generation of an error: the CONFIG command, the CAPTURE command and the IDLE command. Controller 24 may, for example, issue the CONFIG command to reprogram VFE 14. Upon receiving and processing the CONFIG command, VFE 14 returns to IDLE state 64. An IDLE command is essentially ignored as VFE 14 is already operating within IDLE state 64.

Upon receiving a CAPTURE command, VFE 14 transitions to CAPTURE state 66 and executes the parameters programmed by the most recent CONFIG command. While in CAPTURE state 66, VFE 14 starts the camera interface hardware 22, and begins receiving and processing video input data 30.

Initially, VFE 14 examines the parameters associated with the CAPTURE command to determine whether snapshot mode is enabled. If snapshot mode is enabled, VFE 14 captures a single video frame of video input data 30, and immediately returns to IDLE state 64 upon capturing the frame. If snapshot mode is not enabled, VFE 14 remains in CAPTURE state 64 and continuously receives and processes video frames.

More specifically, VFE 14 receives video input data 30, and processes the data to produce video output data 35 into acceptable format for VBE 16 based on commands and configuration parameters 23 received from controller 24. In addition, VFE 14 formats video input data 30 to produce video display data 35 in a form suitable for display by viewfinder 17, and stores video output data 35 within video memory 15 for access by VBE 16 or controller 24.

While operating in capture mode 66, VFE 14 invokes functional modules 30A-30F based on the programmable parameters provided by controller 24. For example, as described above, camera driver 30A programmably configures camera interface hardware 22 to start and stop video capture. Frame rate control module 30B processes video input data 30 captured by image sensor 23 and produced by camera interface 22 to a desirable frame rate.

Image processing module 30C may perform complex image processing operations on video input data 30 based on the parameters provided by controller 24 via the CONFIG command. Viewfinder driver 30D processes video input data 30 from video memory 15 to produce video display data 35 in a form suitable for display by viewfinder 17.

Image size control module 30E provides functionality to down sample an image size to a desirable image size. Color conversion module 30F provides functionality for converting video input data 30 to a different color space, e.g., a different format for representing the color image data, as may be required by VBE 16 or viewfinder 17.

VFE 14 terminate image capture and returns to IDLE state 64 upon receiving an IDLE command from controller 66.

Figure 4:
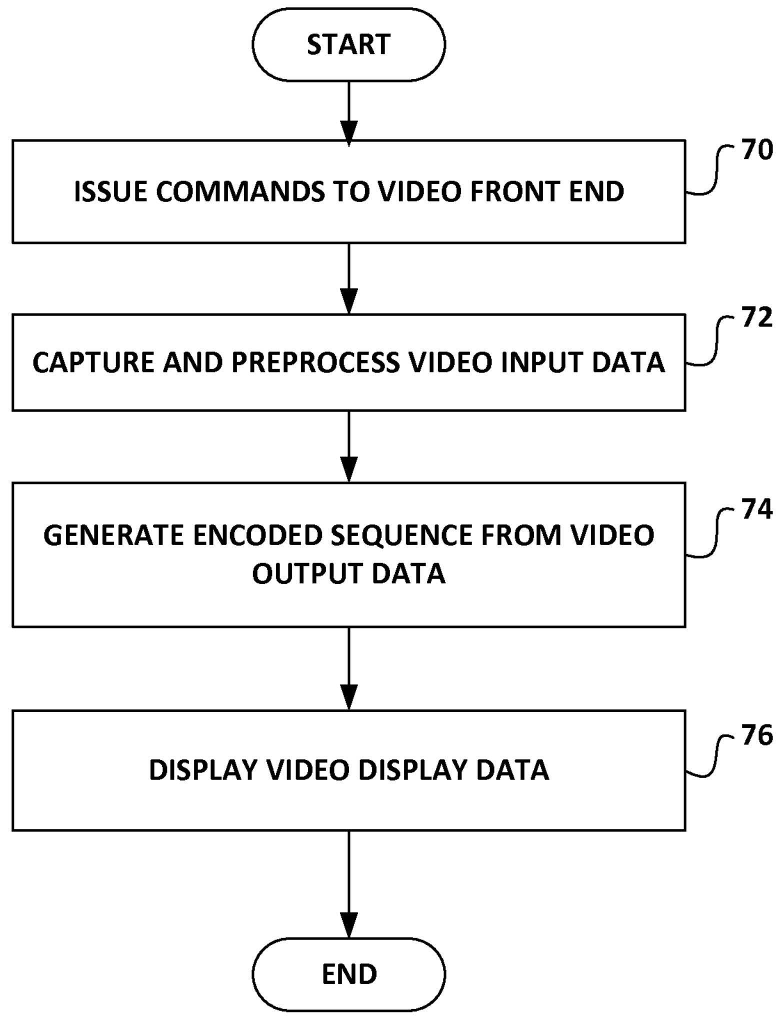
FIG. 4 is a flowchart illustrating an example operation of a digital video device.

FIG. 4 is a flowchart illustrating example operation of digital video device 10. Initially, controller 24 programmatically configures CODEC 12 via commands 25 via the inter-processor interface of VFE 14 (70). In this manner, controller 24 may be viewed as a master device, and CODEC 12 as a slave device.

When CODEC 12 operates as an encoder, VFE 14 captures and pre-processes video input data 30 in accordance with the commands to produce video output data 35 in a first image format and video display data in a second image format (72). During the process VFE 14 generates the video output data and the video display data in accordance with programmable formats, e.g., programmable frame rates, image sizes, and color spaces. VFE 14 communicates the video output data to VBE 16 for generation of an encoded sequence of video data (74), and communicates the video display data to controller 24 for display on viewfinder 17 (76). In similar fashion, VFE 14 may receive decoded video sequences from VBE 16, and process and display the decoded video sequences in accordance with commands 25 provided by controller 24.

Various embodiments have been described in which an example video encoder/decoder (CODEC) is partitioned between a video front end (VFE) and a video back end (VBE). As described within this disclosure, the VFE encapsulates functionality and pre-processing operations to support a variety of camera or camcorder applications, and presents a flexible inter-processor by which an external master device can easily control these operations. This partitioning yields a distributed video system that insulates the VBE from a variety of implementation-specific functions, such as interfacing directly with camera interface hardware, performing color conversion and other image processing functions necessary to drive viewfinder, or other implementation-specific operations. Consequently, the techniques described herein may provide increased flexibility to ease integration of digital video capabilities within new devices. For example, a designer may easily reuse the VFE with any desired back-end software or firmware, or combination thereof, to integrate video data capabilities into new products or devices. These and other embodiments are within the scope of the following claims.

The invention claimed is:

1. A device comprising:

a processor having instructions configured to partition and integrate digital video capabilities and in a first partition, when functioning as an encoder, receive configuration commands from a controller via an inter-processor interface, receive a pre-processed and formatted video output data (VOD) from a second partition and encode the VOD in accordance with the configuration commands, provide status information to indicate a status of the received configuration commands to the controller via the inter-processor interface and, when functioning as a decoder, receive video data sequences (VDS) from a remote source, decode the VDS, and provide the decoded VDS for post-processing by the second partition; and a memory to store the instructions.

2. The device of claim 1, wherein the VOD is encoded in accordance with at least one data compression standard.

3. The device of claim 1, wherein the VDS is decoded in accordance with at least one decoding standard.

4. The device of claim 1, further comprising a transmitter and a receiver, the transmitter configured to transmit the encoded VOD and the receiver configured to receive the VDS from the remote source.

5. The device of claim 1, wherein the device is selected from the group consisting of: a laptop computer, a personal digital assistant (PDA), a wireless communication device, a digital video telephone, and a wireless video device.

6. A device comprising:

a processor having instructions configured to partition and integrate digital video capabilities and, in a video back end (VBE) partition, receive video data sequences (VDS) from a remote source, decode the VDS, and provide the decoded VDS for post-processing by a video front end (VFE) partition, and, in the VFE partition, receive configuration commands from a controller via an inter-processor interface, process the decoded VDS in accordance with the configuration commands, and provide status information to indicate a status of the received configuration commands to the controller via the inter-processor interface; and a memory to store the instructions.

7. The device of claim 6, wherein the VDS is decoded in accordance with at least one decoding standard.

8. The device of claim 6, further comprising a receiver configured to receive the VDS from the remote source.

9. The device of claim 6, wherein the device is selected from the group consisting of: a laptop computer, a personal digital assistant (PDA), a wireless communication device, a digital video telephone, and a wireless video device.

10. A computer-readable medium having instructions for causing a computer to:

partition and integrate digital video capabilities in a first partition and a second partition;

receive a pre-processed and formatted video output data (VOD) from the second partition in the first partition when functioning as an encoder;

receive configuration commands in the first partition from a controller via an inter-processor interface;

encode the VOD in the first partition in accordance with the configuration commands;

provide status information in the first partition to indicate a status of the received configuration commands to the controller via the inter-processor interface;

receive video data sequences (VDS) from a remote source in the first partition when functioning as a decoder;

decode the VDS in the first partition; and provide from the first partition the decoded VDS for post-processing by the second partition.

11. The computer-readable medium of claim 10, wherein the instructions to cause the computer to encode include instructions to encoded the VOD in accordance with at least one data compression standard.

12. The computer-readable medium of claim 10, wherein the instructions to cause the computer to decode include instructions to cause the computer to decode the VDS in accordance with at least one decoding standard.

13. A computer-readable medium having instructions for causing a computer to:

partition and integrate digital video capabilities;

receive video data sequences (VDS) from a remote source, in a video back end (VBE) partition;

decode the VDS in the VBE partition;

provide the decoded VDS to a video front end (VFE) partition for post-processing in the VFE partition;

receive configuration commands from a controller via an inter-processor interface in the VFE partition;

process the decoded VDS in the VFE partition in accordance with the configuration commands; and provide status information in the VFE partition to indicate a status of the received configuration commands to the controller via the inter-processor interface.

14. The computer-readable medium of claim 13, wherein the instructions to cause the computer to decode include instructions to cause the computer to decode the VDS in accordance with at least one decoding standard.

15. A distributed video system for a device, the system comprising:

means for partitioning and integrating digital video capabilities in a first partition and a second partition;

means for receiving a pre-processed and formatted video output data (VOD) from the second partition in the first partition when functioning as an encoder;

means for receiving configuration commands in the first partition from a controller via an inter-processor interface;

means for encoding the VOD in the first partition in accordance with the configuration commands;

means for providing status information in the first partition to indicate a status of the received configuration commands to the controller via the inter-processor interface;

means for receiving video data sequences (VDS) from a remote source in the first partition when functioning as a decoder;

means for decoding the VDS in the first partition; and means for providing from the first partition the decoded VDS for post-processing by the second partition.

16. The distributed video system of claim 15, wherein the means for encoding includes means for encoding the VOD in accordance with at least one data compression standard.

17. The distributed video system of claim 15, wherein the means for decoding comprises means for decoding the VDS in accordance with at least one decoding standard.

18. The distributed video system of claim 15, wherein the device is selected from the group consisting of: a laptop computer, a personal digital assistant (PDA), a wireless communication device, a digital video telephone, and a wireless video device.

19. A distributed video system for a device, the system comprising:

means for partitioning and integrating digital video capabilities;

means for receiving video data sequences (VDS) from a remote source, in a video back end (VBE) partition;

means for decoding the VDS in the VBE partition;

means for providing the decoded VDS to a video front end (VFE) partition for post-processing in the VFE partition;

means for receiving configuration commands from a controller via an inter-processor interface in the VFE partition;

means for processing the decoded VDS in the VFE partition in accordance with the configuration commands; and means for providing status information in the VFE partition to indicate a status of the received configuration commands to the controller via the inter-processor interface.

20. The distributed video system of claim 19, wherein the means for decoding includes means for decoding the VDS in accordance with at least one decoding standard.

21. The distributed video system of claim 19, wherein the device is selected from the group consisting of: a laptop computer, a personal digital assistant (PDA), a wireless communication device, a digital video telephone, and a wireless video device.

22. A method for distributed video processing comprising:

partitioning and integrating digital video capabilities in a first partition and a second partition;

receiving a pre-processed and formatted video output data (VOD) from the second partition in the first partition when functioning as an encoder;

receiving configuration commands from a controller via an inter-processor interface in the first partition;

encoding the VOD in the first partition in accordance with the configuration commands;

providing status information in the first partition to indicate a status of the received configuration commands to the controller via the inter-processor interface;

receiving video data sequences (VDS) from a remote source in the first partition when functioning as a decoder;

decoding the VDS in the first partition; and providing from the first partition the decoded VDS for post-processing by the second partition.

23. The method of claim 22, wherein the encoding includes encoding the VOD in accordance with at least one data compression standard.

24. The method of claim 22, wherein the decoding comprises decoding the VDS in accordance with at least one decoding standard.

25. A method for distributed video processing comprising:

partitioning and integrating digital video capabilities;

receiving video data sequences (VDS) from a remote source, in a video back end (VBE) partition;

decoding the VDS in the VBE partition; and providing the decoded VDS to a video front end (VFE) partition for post-processing in the VFE partition;

receiving configuration commands from a controller via an inter-processor interface in the VFE partition;

process the decoded VDS in the VFE partition in accordance with the configuration commands; and provide status information in the VFE partition to indicate a status of the received configuration commands to the controller via the inter-processor interface.

26. The method of claim 25, wherein the decoding includes decoding the VDS in accordance with at least one decoding standard.

27. A device comprising:

a processor having instructions configured to partition and integrate digital video capabilities and, in a first partition, receive configuration commands with parameters from a controller via an inter-processor interface, the parameters configured to set pre-processing image operations of a video data signal from or to at least one device peripheral, and post-processing of a decoded video signal from a second partition, and provide status information to indicate a status of the received configuration commands to the controller via the inter-processor interface; and a memory to store the instructions.

28. The device of claim 27, wherein the pre-processing image operations includes processing the video data signal into video output data (VDD) having a compatible format for display by the at least one peripheral.

29. The device of claim 28, wherein the at least one device peripheral includes a device display and an image sensor.

30. The device of claim 29, wherein the device display includes one of a viewfinder and a cellular phone display.

31. The device of claim 27, wherein the first partition includes a plurality of functional modules, and the controller programmatically configures the plurality of functional modules.

32. The device of claim 31, wherein the plurality of functional modules include:

a viewfinder driver for presenting video display data in accordance with the parameters;

a frame rate control module to generate video output data from the pre-processed video signal and the video display data at programmable frame rates in accordance with the parameters;

an image size control module to generate the video output data and the video display data at programmable image sizes in accordance with the parameters;

a color conversion module that, based on the parameters, generates the video output data in accordance with a first color space for processing by the second partition, and the video display data in accordance with a second color space for display by the viewfinder driver; and an image processing module to perform one or more image manipulation operations on the video data signal in accordance with the parameters.

33. The device of claim 32, wherein the processor is further configured to programmatically receive from the controller parameters to set a frame row width, a number of pixels per row, a frame column height, a number of rows per frame for each of the image formats.

34. The device of claim 32, wherein the processor is further configured to programmatically receive from the controller a specified first bit pattern for selecting frames to drop from the video data signal and a second bit pattern for selecting X and Y pixels to drop from each frame of the video data signal to produce the video output data.

35. The device of claim 32, wherein the processor is further configured to receive from the controller a capture command to programmatically initiate capture of the video data signal by the first partition, an idle command to programmatically terminate capture of the video data signal, and a configure command to programmatically set parameters for the capture and pre-processing of the video data signal.

36. The device of claim 27, wherein the device is selected from the group consisting of: a laptop computer, a personal digital assistant (PDA), a wireless communication device, a digital video telephone, and a wireless video device.

37. A device comprising:

a processor having instructions configured to distribute digital video functionality and, in a first partition, receive configuration commands with parameters from a controller via an inter-processor interface, the parameters configured to set pre-processing image operations of a video data signal from or to at least one device peripheral and to a second partition for encoding and post-processing for a decoded video signal from the second partition, and provide status information to indicate a status of the received configuration commands to the controller via the inter-processor interface; and a memory to store the instructions.

38. The device of claim 37, wherein the pre-processing image operations includes processing the video data signal into video output data (VDD) having a compatible format for display by the at least one peripheral.

39. The device of claim 38, wherein the at least one device peripheral includes a device display and an image sensor.

40. The device of claim 39, wherein the device display includes one of a viewfinder and a cellular phone display.

41. The device of claim 37, wherein the first partition includes a plurality of functional modules programmatically configurable by the controller.

42. The device of claim 41, wherein the plurality of functional modules include:

a viewfinder driver for presenting video display data in accordance with the parameters;

a frame rate control module to generate video output data from the pre-processed video signal and the video display data at programmable frame rates in accordance with the parameters;

an image size control module to generate the video output data and the video display data at programmable image sizes in accordance with the parameters;

a color conversion module that, based on the parameters, generates the video output data in accordance with a first color space for processing by the second partition, and the video display data in accordance with a second color space for display by the viewfinder driver; and an image processing module to perform one or more image manipulation operations on the video data signal in accordance with the parameters.

43. The device of claim 42, wherein the processor is further configured to programmatically receive from the controller parameters to set a frame row width, a number of pixels per row, a frame column height, a number of rows per frame for each of the image formats.

44. The device of claim 42, wherein the processor is further configured to programmatically receive from the controller a specified first bit pattern for selecting frames to drop from the video data signal and a second bit pattern for selecting X and Y pixels to drop from each frame of the video data signal to produce the video output data.

45. The device of claim 37, wherein the processor is further configured to receive from the controller a capture command to programmatically initiate capture of the video data signal by the first partition, an idle command to programmatically terminate capture of the video data signal, and a configure command to programmatically set parameters for the capture and pre-processing of the video data signal.

46. The device of claim 37, wherein the device is selected from the group consisting of: a laptop computer, a personal digital assistant (PDA), a wireless communication device, a digital video telephone, and a wireless video device.

47. A computer-readable medium with instructions for causing a computer to:

distribute digital video functionality between a first partition and a second partition;

receive configuration commands with settable parameters from a controller via an inter-processor interface, in the first partition;

pre-process image operations of a video data signal from or to at least one device peripheral in the first partition according to the parameters;

provide status information in the first partition to indicate a status of the received configuration commands to the controller via the inter-processor interface; and post-process a decoded video signal from the second partition in the first partition.

48. The computer-readable medium of claim 47, wherein the instructions to pre-process image operations includes instructions to cause the computer to process the video data signal into video output data (VDD) having a compatible format for display by the at least one peripheral.

49. The computer-readable medium of claim 48, wherein the at least one device peripheral includes a device display and an image sensor.

50. The computer-readable medium of claim 48, wherein the device display includes one of a viewfinder and a cellular phone display.

51. The computer-readable medium of claim 47, wherein the first partition includes a plurality of functional modules and further comprising instructions to programmatically configure the plurality of functional modules by the controller.

52. The computer-readable medium of claim 51, further comprising instructions to cause the computer to:

present video display data, by the first partition, in accordance with the parameters for a viewfinder driver;

control a frame rate, by the first partition, to generate video output data from the pre-processed video signal and the video display data at programmable frame rates in accordance with the parameters;

control an image size, by the first partition, to generate the video output data and the video display data at programmable image sizes in accordance with the parameters; and convert color, by the first partition, based on the parameters, to generate the video output data in accordance with a first color space for processing by the second partition, and the video display data in accordance with a second color space for display by the viewfinder driver.

53. The computer-readable medium of claim 52, wherein the parameters set a frame row width, a number of pixels per row, a frame column height, a number of rows per frame for each of the image formats.

54. The computer-readable medium of claim 52, further comprising instructions to cause the computer to: receive, by the first partition, from the controller a specified first bit pattern for selecting frames to drop from the video data signal and a second bit pattern for selecting X and Y pixels to drop from each frame of the video data signal to produce the video output data.

55. The computer-readable medium of claim 47, further comprising instructions to cause the computer to: receive from the controller a capture command to programmatically initiate capture of the video data signal by the first partition; receive an idle command to programmatically terminate capture of the video data signal; and receive a configure command to programmatically control the capture and pre-processing of the video data signal.

56. The computer-readable medium of claim 47, wherein the device is selected from the group consisting of: a laptop computer, a personal digital assistant (PDA), a wireless communication device, a digital video telephone, and a wireless video device.

* * * * *